(12) United States Patent
Iwasaki

(10) Patent No.: US 10,116,857 B2
(45) Date of Patent: Oct. 30, 2018

(54) FOCUS ADJUSTMENT APPARATUS, CONTROL METHOD OF FOCUS ADJUSTMENT APPARATUS, AND IMAGING APPARATUS

(71) Applicant: CANON KABUSHIKI KAISHA, Tokyo (JP)

(72) Inventor: Naoki Iwasaki, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/698,239

(22) Filed: Sep. 7, 2017

(65) Prior Publication Data

US 2018/0077340 A1 Mar. 15, 2018

(30) Foreign Application Priority Data

Sep. 14, 2016 (JP) .................. 2016-179918

(51) Int. Cl.
| | |
|---|---|
| H04N 5/232 | (2006.01) |
| G02B 7/34 | (2006.01) |
| H04N 5/235 | (2006.01) |
| G02B 7/28 | (2006.01) |
| G03B 13/36 | (2006.01) |

(52) U.S. Cl.
CPC .......... *H04N 5/23212* (2013.01); *G02B 7/28* (2013.01); *G02B 7/34* (2013.01); *G02B 7/343* (2013.01); *G02B 7/346* (2013.01); *H04N 5/235* (2013.01); *H04N 5/23264* (2013.01); *G03B 13/36* (2013.01); *H04N 5/2351* (2013.01)

(58) Field of Classification Search
CPC .......... H04N 5/23212; H04N 5/23264; H04N 5/235; H04N 5/2351; H04N 5/3696; G02B 7/28; G02B 7/34; G02B 7/343; G02B 7/346; G03B 13/36
See application file for complete search history.

(56) References Cited

U.S. PATENT DOCUMENTS

| | | | | |
|---|---|---|---|---|
| 5,469,240 | A * | 11/1995 | Uchiyama ............... | G02B 7/346 396/104 |
| 2010/0208117 | A1* | 8/2010 | Shintani ............. | H04N 5/23209 348/311 |
| 2010/0302433 | A1* | 12/2010 | Egawa ..................... | G02B 7/34 348/345 |

(Continued)

FOREIGN PATENT DOCUMENTS

JP 2016-142895 A 8/2016

*Primary Examiner* — Shahbaz Nazrul
(74) *Attorney, Agent, or Firm* — Canon USA Inc., IP Division

(57) ABSTRACT

An imaging apparatus includes: a focus detection unit that detects a defocus amount using the pair of parallax image signals; a control unit that controls adjustment of a focus position based on the defocus amount; a first determination unit that determines whether a subject with a repetitive pattern is being imaged in a focus detection area; and a second determination unit that determines whether a degree of image blurring is equal to or more than a predetermined degree of blurring. When the first determination unit determines that a subject with a repetitive pattern is being imaged and the second determination unit determines that a degree of image blurring is equal to or more than the predetermined degree of blurring, the control unit moves a focus lens to acquire a new defocus amount.

11 Claims, 16 Drawing Sheets

(56) References Cited

U.S. PATENT DOCUMENTS

| | | | | |
|---|---|---|---|---|
| 2011/0134310 A1* | 6/2011 | Kimura | ............... | G02B 7/28 |
| | | | | 348/345 |
| 2011/0304765 A1* | 12/2011 | Yogo | ............... | G02B 7/34 |
| | | | | 348/345 |
| 2012/0281131 A1* | 11/2012 | Isobe | ............... | G02B 7/343 |
| | | | | 348/345 |
| 2015/0062307 A1* | 3/2015 | Ishiga | ............... | H04N 13/111 |
| | | | | 348/49 |
| 2015/0130986 A1* | 5/2015 | Ohnishi | ............... | H04N 5/23212 |
| | | | | 348/349 |
| 2017/0104918 A1* | 4/2017 | Iwane | ............... | H04N 5/23212 |
| 2018/0017759 A1* | 1/2018 | Sakaguchi | ............... | G02B 7/38 |
| 2018/0176453 A1* | 6/2018 | Yamazaki | ............... | H04N 5/23212 |

\* cited by examiner

FIG. 12

|  | LOW-PASS FILTER | MID-PASS FILTER | HIGH-PASS FILTER |
|---|---|---|---|
| DEGREE OF RELIABILITY 0 | ○ | ○ | ○ |
| DEGREE OF RELIABILITY 1 | ○ | ○ | × |
| DEGREE OF RELIABILITY 2 | ○ | ○ | ○ |
| DEGREE OF RELIABILITY 3 | × | ○ | ○ |

FOCUS ADJUSTMENT APPARATUS, CONTROL METHOD OF FOCUS ADJUSTMENT APPARATUS, AND IMAGING APPARATUS

BACKGROUND OF THE INVENTION

Field of the Invention

The present invention relates to a focus adjustment apparatus, a control method of focus adjustment apparatus, and an imaging apparatus including the focus adjustment apparatus.

Description of Related Art

There have been proposed various schemes for autofocus (AF) methods in imaging apparatuses. Main schemes include a phase difference detection method (hereinafter, called phase difference AF).

According to the phase difference AF method, light beams from a subject are passed though different exit pupil areas in an imaging optical system and are focused onto an imaging element, and the defocus amount in the imaging optical system is calculated from a phase difference between a pair of parallax image signals obtained from the imaging element. Then, a focus lens is moved by the movement amount equivalent to the defocus amount to obtain the in-focus state. The phase difference AF is generally carried out by using parallax image signals from an AF sensor provided separately from the imaging element for use in shooting a subject. In recent years, however, there has been proposed a technique called imaging plane phase difference AF by which parallax image signals are acquired from the imaging element for use in shooting a subject.

Japanese Patent Application Laid-Open No. 2016-142895 proposes a focus adjustment apparatus and an imaging apparatus that perform stable AF operation in the imaging plane phase difference AF by evaluating the degree of reliability (reliability) of the calculated defocus amount and making focus adjustments depending on the degree of reliability.

As one of subjects that are prone to have a reduction in the accuracy of focus detection by the phase difference AF, there is a subject with a periodical pattern (repetitive pattern). According to the phase difference AF, a pair of parallax image signals is shifted by correlation calculation to detect a position with a high correlation between the two images, and the defocus amount is acquired with the position regarded as in-focus position. Using the image signals of a subject with a periodic pattern in the correlation calculation may cause a point with a high correlation between the two images at a position not in the neighborhood of the in-focus position, whereby the incorrect position (false focal point) is regarded as in-focus focus point. Once the false position is regarded as in-focus point, even though the degree of reliability of the defocus amount is acquired as described in Japanese Patent Application Laid-Open No. 2016-142895, the actual degree of the reliability of the defocus amount is low in precision. Accordingly, it is difficult to select the focus adjusting operation using the degree of reliability.

In view of the above, there is a need to provide a focus adjustment apparatus and an imaging apparatus that can perform an appropriate focus adjusting operation even on a subject with a periodic pattern.

SUMMARY OF THE INVENTION

According to at least one embodiment of the present invention, a focus adjustment apparatus includes: an imaging unit that converts light from an optical system to an electric signal by photoelectric conversion and outputs an image signal for imaging and a pair of parallax image signals in a focus detection area; a focus detection unit that detects a defocus amount using the pair of parallax image signals; a control unit that controls adjustment of a focus position of the optical system based on the defocus amount; a first determination unit that determines whether the imaging unit is imaging a subject with a repetitive pattern in the focus detection area; and a second determination unit that determines whether a degree of image blurring is equal to or more than a predetermined degree of blurring using at least one of the image signal for imaging and the pair of parallax image signals, wherein, when the first determination unit determines that the imaging unit is imaging a subject with a repetitive pattern in the focus detection area and the second determination unit determines that the degree of image blurring is equal to or more than the predetermined degree of blurring, the control unit moves a focus lens in the optical system to acquire a new defocus amount.

Further features of the present invention will become apparent from the following description of exemplary embodiments with reference to the attached drawings.

BRIEF DESCRIPTION OF THE DRAWINGS

FIG. 12 is a table of correspondence between a filter and the degree of reliability in the embodiment.

DESCRIPTION OF THE EMBODIMENTS

Exemplary embodiment of the present invention will be described below in detail with reference to the attached drawings. The embodiment described below is a mere example and the present invention is not limited to the configuration in the embodiment.

Figure 1:
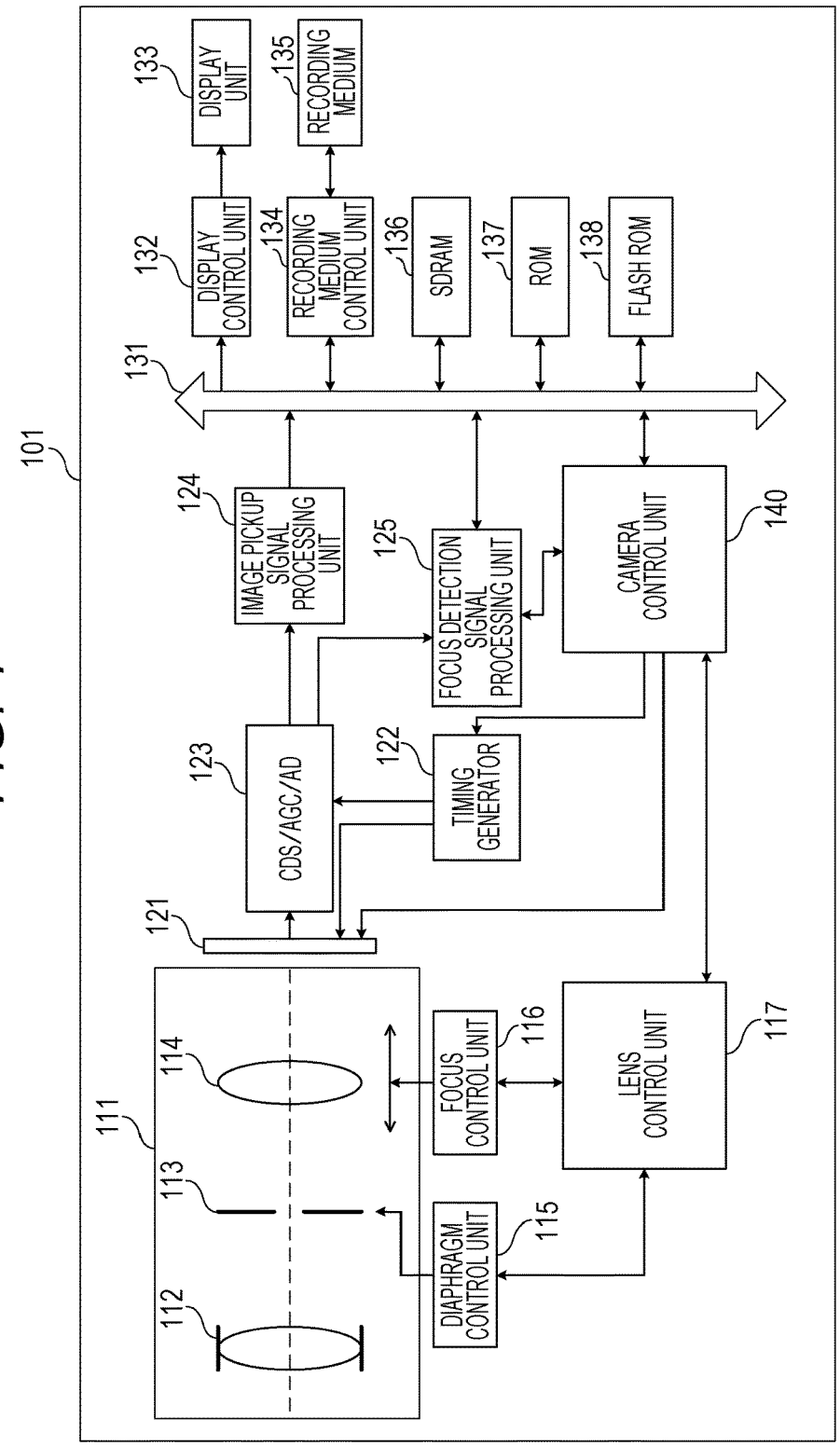
FIG. 1 is a block diagram of an imaging apparatus in an embodiment.

Referring to FIG. 1, a configuration of an imaging apparatus under a phase difference detection scheme in the embodiment will be described. FIG. 1 is a block diagram of an imaging apparatus 101. Examples of the imaging apparatus 101 include, but are not limited to, a digital still camera, a video camera, and the like that can capture images of a subject and records data of the moving images or still images on various media such as tapes, solid-state memories, optical discs, and magnetic discs. The imaging apparatus illustrated in FIG. 1 includes a shooting lens 111. However, the embodiment is also applicable to imaging apparatuses without the shooting lens 111 such as lens-interchangeable digital still cameras and video cameras.

The shooting lens 111 (lens unit) includes a fixed lens 112, a diaphragm 113, and a focus lens 114, which constitutes an optical system in the imaging apparatus 101. A diaphragm control unit 115 drives the diaphragm 113 to adjust the aperture diameter of the diaphragm 113 for light amount control in shooting. A focus control unit 116 controls the driving of the focus lens 114 to control the focus adjustment. The focus control unit 116 controls the position of the focus lens 114 to achieve automatic focus adjustment (autofocus or AF). The focus lens 114 is a lens for focus adjustment that is generally formed from a plurality of lenses, although it is illustrated as a single lens in a simplified manner in FIG. 1. The diaphragm control unit 115 and the focus control unit 116 are controlled by a lens control unit 117. In the case of a lens-interchangeable imaging apparatus without the shooting lens 111, a camera control unit 140 transmits information necessary for focus adjustment such as lens drive amount, defocus amount, or image displacement amount to the lens control unit 117 for the attached lens. Accordingly, the imaging apparatus can control focus adjustment by controlling the attached lens.

A light beam having entered via these optical members (the shooting lens 111) is focused on the light receiving surface of an imaging element 121 and converted into an electrical signal by the imaging element 121. The imaging element 121 has a plurality of photoelectric conversion elements that converts light from the optical system into a subject image (optical image) by photoelectric conversion of the light into signal charges. The imaging element 121 is formed from CCDs or CMOS sensors. The signal charges accumulated in the photoelectric conversion elements are read sequentially as voltage signals according to the signal charges from the imaging element 121 by a driving pulse output from a timing generator 122.

A CDS/AGC/AD circuit 123 performs correlated double sampling for removing reset noise, adjustment of sensor gain, digitization of signals on the imaging signals and the focus detection signals read from the imaging element 121. The CDS/AGC/AD circuit 123 outputs the imaging signals to an imaging signal processing unit 124 and outputs the signals for focus detection under the phase difference detection scheme to a focus detection signal processing unit 125. The focus detection signal processing unit 125 performs correlation calculation on two focus detection image signals output from the CDS/AGC/AD circuit 123 to calculate information about image displacement amount and the degree of reliability of the image displacement amount (the level of coincidence of two images and the degree of steepness of two images). The focus detection signal processing unit 125 further calculates from the obtained image displacement amount the defocus amount in a shooting optical system (information including the defocus direction indicating to which of the minimum-object-distance side and the infinite distance end side the image is displaced). The information on the degree of reliability of the image displacement amount is also information on the degree of reliability of the defocus amount acquired from the image displacement amount. In addition, the focus detection signal processing unit 125 sets and lays out focus detection areas for focus detection in an imaging surface.

Figure 2:
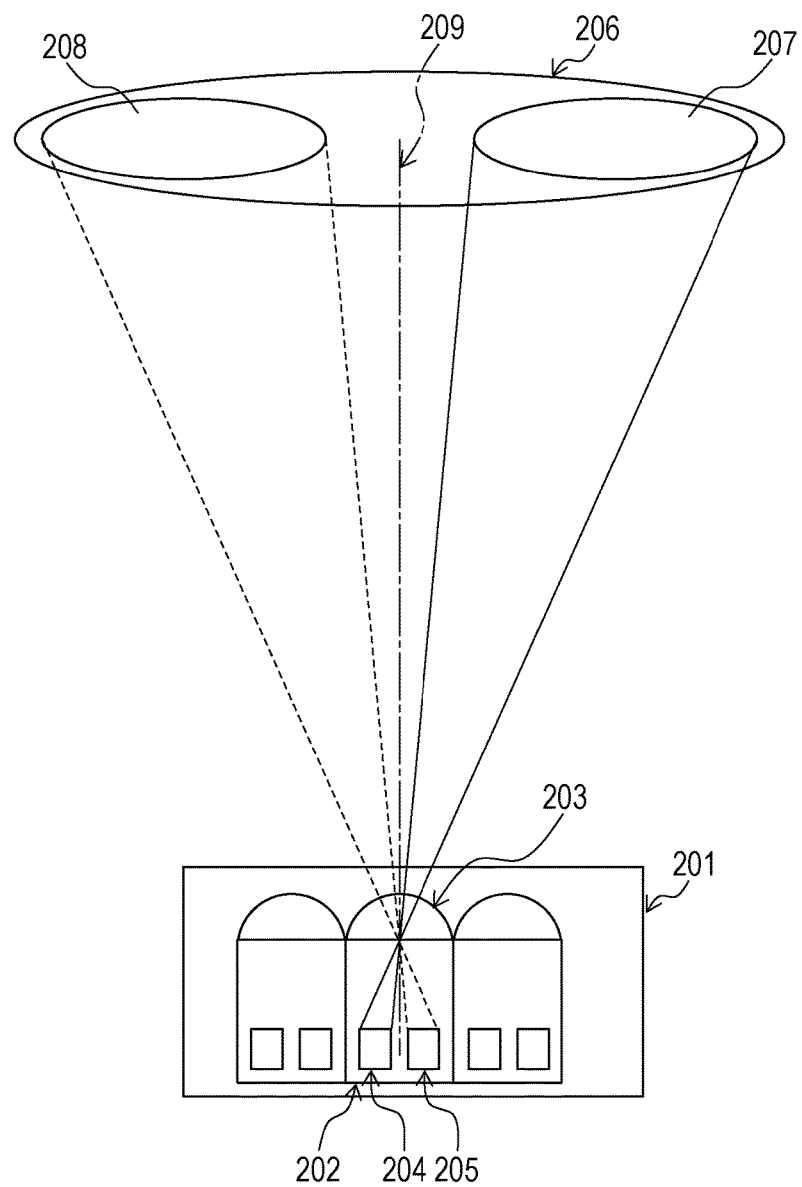
FIG. 2 is a schematic diagram illustrating the relationship between a pupil in an optical system and light received by an imaging element in the embodiment.

The relationship between the imaging element 121 and a pupil 206 of the shooting lens 111 will be described with reference to FIG. 2. The imaging element 121 includes a two-dimensional array of m x n pixels, and reference sign 201 in FIG. 2 indicates the cross section of the imaging element 121. Each pixel 202 has a micro lens 203 and two photoelectric conversion elements (204 and 205) and acquires two signals for imaging and focus detection by one pixel. Light beams having passed through different areas (207 and 208) of the pupil 206 of the shooting lens 111 enter the two photoelectric conversion elements (204 and 205) provided in each pixel 202 via the micro lens 203 disposed in the pixel 202 around an optical axis 209. Outputs from the two photoelectric conversion elements (204 and 205) are added up to acquire the imaging signal that is then adjusted and turned into image data by the imaging signal processing unit 124. In addition, the outputs from the two photoelectric conversion elements can be separately treated to acquire two images different in parallax (a pair of parallax images). These images are used as a focus detection signal by the focus detection signal processing unit 125 to perform calculation for focus detection. In the following description of the embodiment, the image obtained by adding up the outputs from the two photoelectric conversion elements is called A+B image, and the images obtained by treating separately the outputs from the two photoelectric conversion elements are called A image and B image. In addition, the signals of the A+B image (the output signal itself and the signal obtained by processing the output signal) are called image signals for imaging, and the signals of the A image and the B image (the output signals themselves and the signals obtained by processing the output signals) are called signals for focus detection, and the image signals for imaging and the signals for focus detection are collectively called image signals. The creation method of the signals for focus detection is not limited to the one according to the embodiment but may be another one. For example, the A image signal and the B image signal may be acquired from different pixels, and a pair of parallax image signals may be acquired from a pair of the output from a photoelectric conversion element eccentric to the right (off-axis in a first direction) with respect to a micro lens and the output from a photoelectric conversion element eccentric to the left (off-axis in a second direction opposite to the first direction) with respect to another micro lens. The focus detection method will be described later in more detail.

The imaging signal processing unit 124 stores the imaging signal output from the CDS/AGC/AD circuit 123 in an SDRAM 136 as a storage unit via a bus 131. The imaging signal processing unit 124 may have a circuit block that calculates a photometric value according to the brightness of a subject and a circuit block that performs image processing such as white balance and gamma correction based on the imaging signal output from the CDS/AGC/AD circuit 123. The image signal for imaging stored in the SDRAM 136 is read by a display control unit 132 via the bus 131 and displayed on a display unit 133. In an operation mode for recording the imaging signal, the image signal for imaging stored in the SDRAM 136 is recorded on a recording medium 135 by a recording medium control unit 134 acting as a recording control unit. The image signal for imaging may be recorded on a storage unit built in the imaging device instead of the recording medium 135.

A ROM 137 as a storage unit stores a control program to be executed by a camera control unit 140 and various data necessary for control. A flash ROM 138 stores various kinds of setting information about the operation of the imaging apparatus 101 such as user setting information.

The camera control unit 140 controls automatic focus adjustment and automatic exposure adjustment based on the control program and the various data necessary for control stored in the ROM 137. The camera control unit 140 also determines the defocus amount output from the focus detection signal processing unit 125 and the lens driving amount based on the degree of reliability of the defocus amount. In the embodiment, when the degree of reliability of the defocus amount output from the focus detection signal processing unit 125 is low, the lens driving amount is set to a fixed value unrelated to the defocus amount output from the focus detection signal processing unit 125, and when the degree of reliability of the defocus amount is high, the lens driving amount is acquired based on the defocus amount. The degree of reliability and the lens driving will be described later in detail. The lens driving amount is transmitted to a lens control unit 117 and transferred to the focus control unit 116 to achieve automatic focus adjustment. Alternatively, the camera control unit 140 may transmit the defocus amount and the degree of reliability of the defocus amount to the lens control unit 117, and the lens control unit 117 or the focus control unit 116 may determine the lens driving amount. Further, the camera control unit 140 determines the accumulation time, the setting value of gain in the CDS/AGC/AD circuit 123, and the setting value of the timing generator 122 under instructions from the operator or based on the magnitude of the pixel signal of the image data temporarily accumulated in the SDRAM 136.

Next, the AF operation of the imaging apparatus 101 will be described with reference to the flowchart of FIG. 3.

Figure 3:
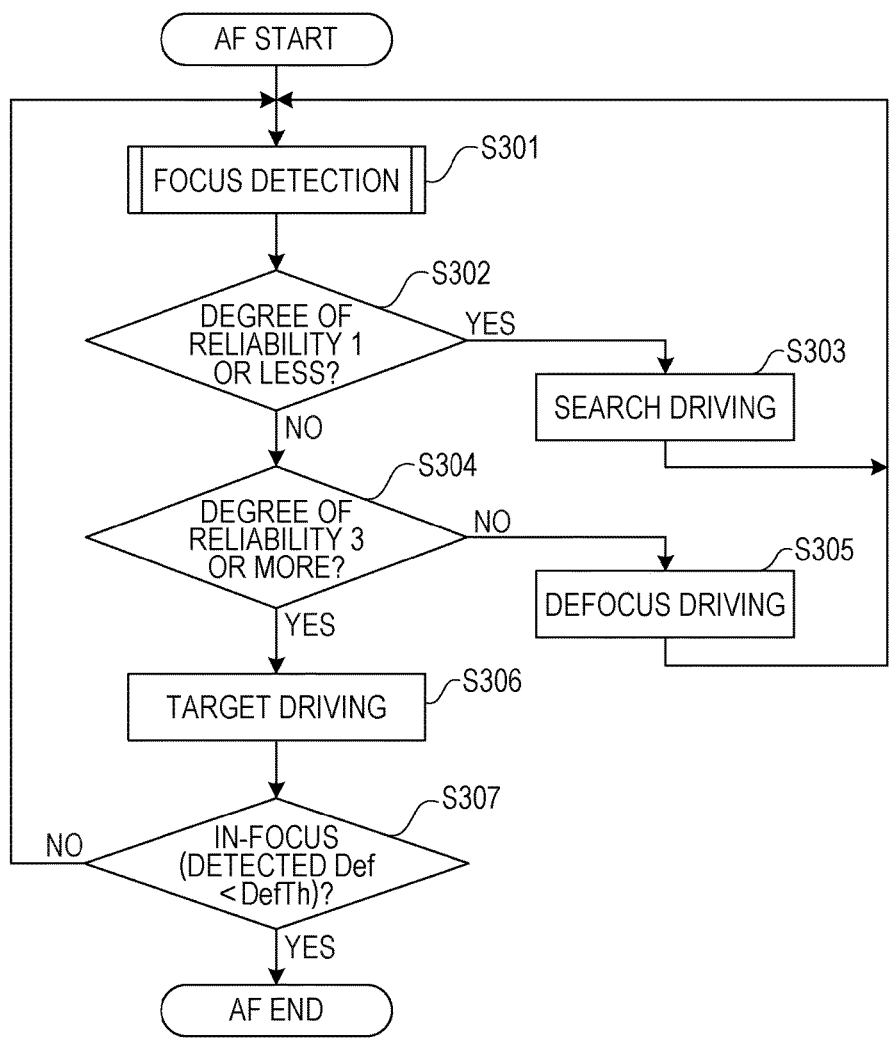
FIG. 3 is a flowchart of a process of AF operation in the embodiment.

FIG. 3 is a flowchart of the AF operation of the imaging apparatus 101. When an AF instruction switch is turned on by a user or the like, the AF operation described in FIG. 3 is started and the focus position of the optical system is moved according to the defocus amount and the degree of reliability of the defocus amount (hereinafter, also called simply the degree of reliability) acquired by the focus detection. The degree of reliability of the defocus amount corresponds to the degree of reliability of the image displacement amount corresponding to the defocus amount. At step S301, the focus detection signal processing unit 125 performs a focus detection process based on a command from the camera control unit 140. By the focus detection process, the defocus amount for performing the phase difference AF using the signals for focus detection acquired from the imaging element 121, that is, the imaging plane phase difference AF, and the degree of reliability are acquired. The acquisition method of the defocus amount and the degree of reliability will be described later in detail. In the embodiment, the degree of reliability is selected from among four candidates of 0 to 3.

At steps S302 to S306, the driving control method of the focus lens 114 (that is, the control method of the focus adjustment operation) is selected and executed according to the acquired defocus amount and degree of reliability to control the movement of the focus position. First, it is determined at step S302 whether the degree of reliability is 1 or less. When the degree of reliability is 1 or less, the process moves to step S303 to execute a first driving control method (hereinafter, called search driving). The search driving is a driving control method by which the focus lens is driven at a predetermined velocity without using the calculated defocus amount to search for the in-focus position. When a predetermined period of time has elapsed from the start of the driving, the imaging element performs light exposure, that is, the imaging element performs light exposure after the driving for the fixed value output from the focus detection signal processing unit 125. Then, the focus detection is performed again based on the acquired signals for focus detection. The driving speed may be constant regardless of shooting conditions or may be set according to the focus depth and the shooting mode. The fixed value output from the focus detection signal processing unit may be a value regardless of the shooting conditions or may be a value set according to the focus depth and the shooting mode. The driving direction is a predetermined direction (for example, a direction close to either the closest distance end or the infinite distance end) not based on the defocus amount when the degree of reliability is 0, and the driving direction is a direction along the defocus amount detected at step S301 when the degree of reliability is 1. The search driving is mainly used to search for the in-focus position when it is determined that the focus position is greatly distant from the in-focus position. When the search driving is performed when the degree of reliability is 1 or less as in the embodiment, the driving of the focus lens and the focus detection are repeated until the degree of reliability becomes 2 or more. The light exposure during the search driving may be performed while the focus lens is stopped or driven. More preferably, the light exposure is performed on a periodic basis while the focus lens is driven because the focus lens can be driven to the position where the degree of reliability is 2 or more quickly than the case in which the focus lens is stopped at each light exposure.

It is determined at step S302 that the degree of reliability is higher than 1, the process moves to step S304 to determine whether the degree of reliability is 3 or more. When the degree of reliability is not 3 or more, the process moves to S305 to execute a second driving control method (hereinafter, called defocus driving). The defocus driving is a driving control method by which the focus lens 114 is driven by the distance corresponding to the amount obtained by multiplying the defocus amount detected at step S301 by a predetermined coefficient. In the embodiment, using 0.7 less than 1 as a coefficient makes it less prone to pass through the in-focus position even with variations in the detected defocus amount. The defocus driving is a driving control method to drive the focus lens with a higher priority placed on the velocity than the accuracy. The defocus driving is mainly used in a control (overlap control) to perform the light exposure for focus detection and the focus detection before the driving of the focus lens is stopped and perform the next lens driving based on the obtained defocus amount and degree of reliability, thereby to bring the focus position into the vicinity of the in-focus position at a high speed.

Figure 4:
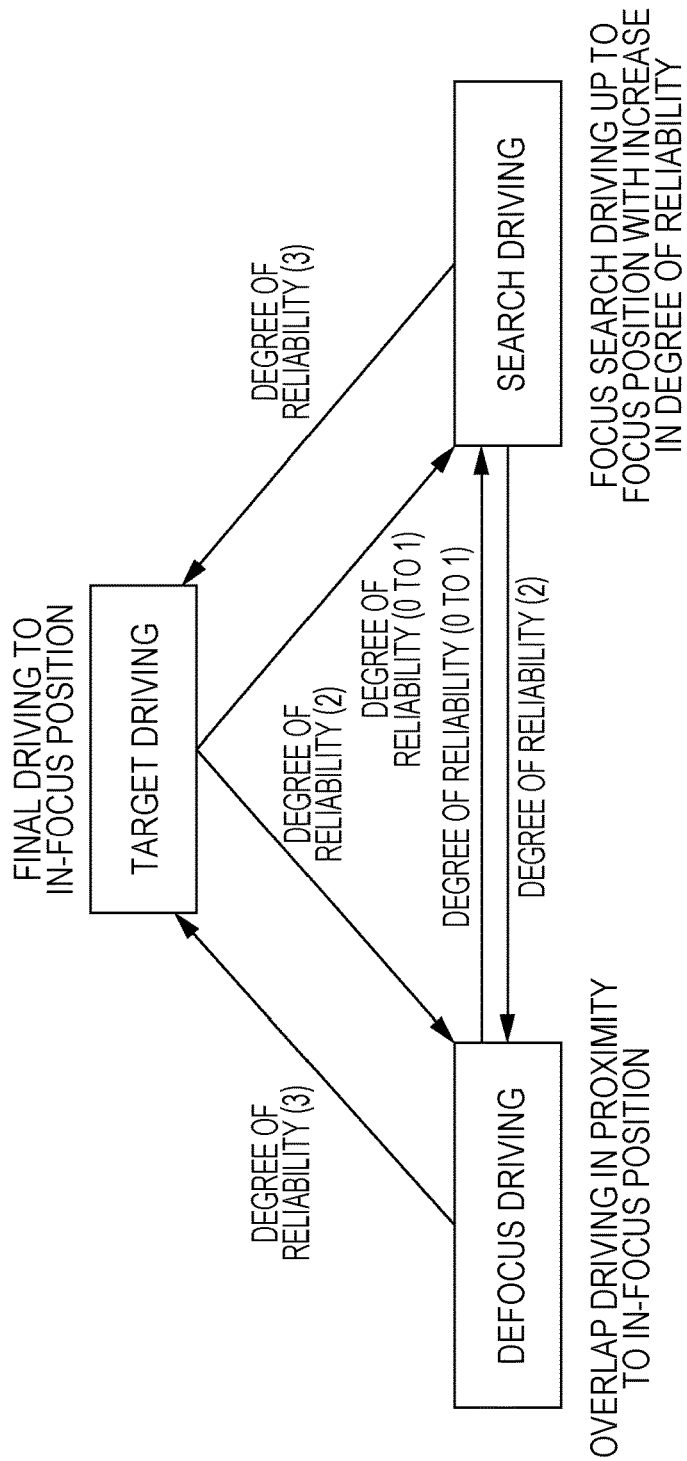
FIG. 4 is a diagram illustrating the relationship between the degree of reliability and a driving control method of a focus lens in the embodiment.

When it is determined at step S304 that the degree of reliability is 3 or more, the process moves to step S306 to execute a third driving control method (hereinafter, called target driving). The target driving is a driving control method by which the focus lens 114 is driven by a distance corresponding to the defocus amount detected at step 301 and make in-focus determination after the stoppage of the lens at the target position. To enhance the detection accuracy and the control accuracy in the focus adjustment, it is preferable to perform exclusively the focus detection process and the focus lens control (focus lens driving). That is, in the target driving, it is preferable to perform the focus detection using the signals for focus detection acquired by the light exposure while the focus lens is stopped. The target driving is mainly used for high-accuracy focus adjustment in the vicinity of the in-focus position. As a supplement, FIG. 4 provides the state transition diagram that illustrates the relationship between the degree of reliability and the driving control method of the focus lens. After the driving of the focus lens in the target driving, in the in-focus determination at step S307, it is determined whether the defocus amount detected at S301 is smaller than a threshold. When the defocus amount is equal to or more than the threshold, the process returns to step S301 to perform the focus detection again, and when the defocus amount is smaller than the threshold, the AF operation is terminated because focus is obtained. This step is carried out to improve the AF accuracy in the general imaging plane phase difference AF in which the defocus amount detected with the use of the signals for focus detection obtained by light exposure with the focus position distant from the in-focus position (way-out-of-focus state) is low in accuracy. Alternatively, step S306 and step S307 may be exchanged in order so that, when the detected defocus amount is equal to or more than the threshold, the process moves to step 305 to perform the defocus driving, and when the detected defocus amount is less than the threshold, the target driving is performed.

Figure 5:
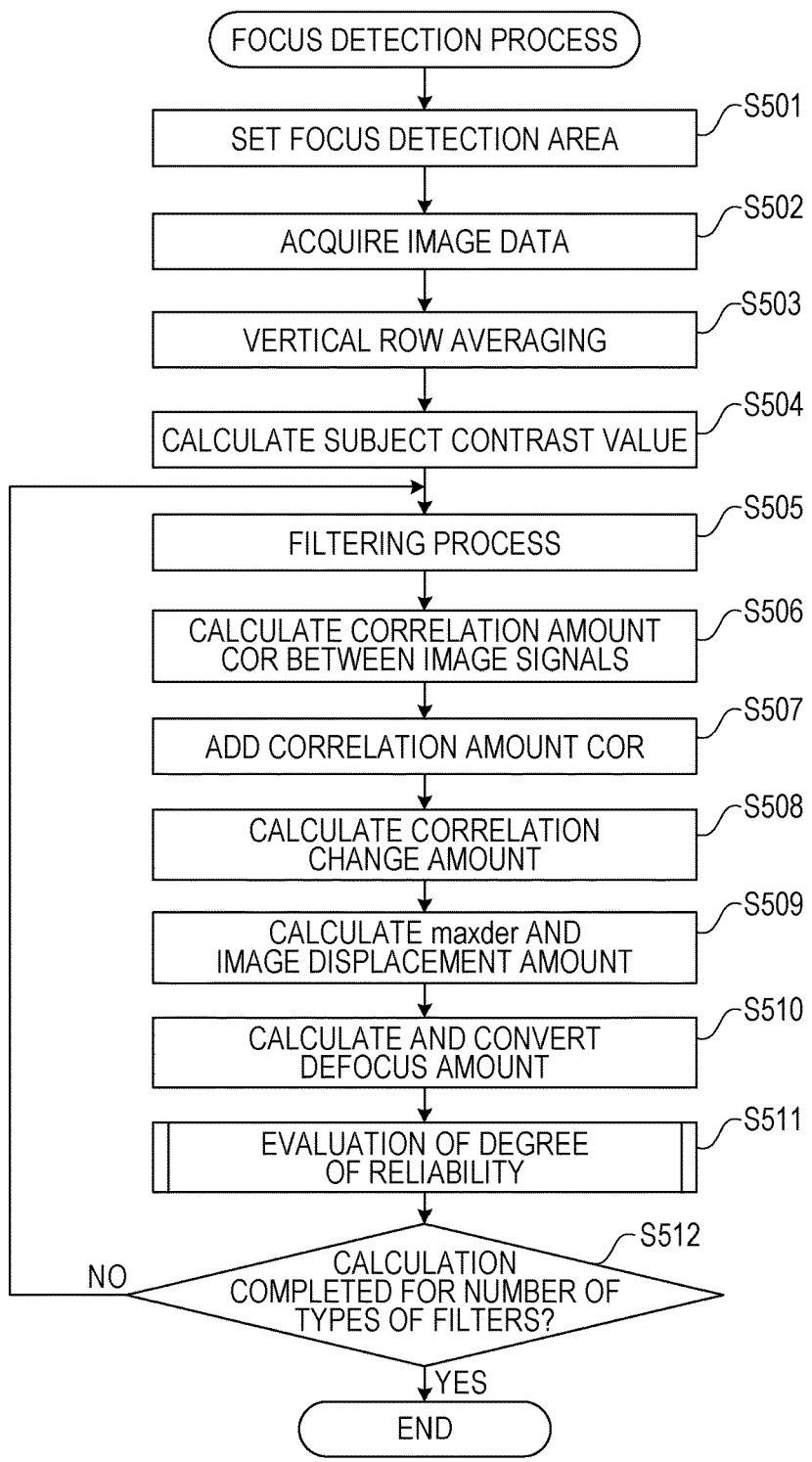
FIG. 5 is a flowchart of a focus detection process in the embodiment.

Next, the method of the focus detection process at step S301 will be described with reference to the flowchart of FIG. 5. The steps described in FIG. 5 are mainly executed by the focus detection signal processing unit 125 based on a command from the camera control unit 140.

At step S501, an arbitrary focus detection area is set from two-dimensionally arranged focus detection areas. Then, the signals for focus detection (A image signal and B image signal) are acquired at step S502 from the imaging element 121 for the set focus detection area. The acquired signals for focus detection are subjected to row averaging in the vertical direction at step S503 to reduce the influence of signal noise. In the embodiment, the number of the vertical row additions is decreased for high-speed arithmetic processing such as operations in a consecutive shooting mode, and the number of the vertical row additions is increased in scenes with conspicuous signal noise such as in dark places. After that, a subject contrast CNT defined by Equation (1) is calculated at step S504 as follows:

$$CNT=(Peak-Bottom)/Peak \tag{1}$$

In the foregoing equation, Peak and Bottom are variables indicating respectively the maximum output value and the minimum output value of the waveform with the vertical averaging. The subject contrast CNT is used to evaluate the degree of reliability of the defocus amount. Next, a filtering process is carried out at step S505 to retrieve a signal component in a predetermined frequency band from the signal undergone the vertical row averaging at step S503. In the embodiment, the defocus amount to be used is switched among defocus amounts calculated with the use of prepared three types of filters (low-pass filter, mid-pass filter, and high-pass filter) depending on the blurring level of the subject. The use of the low-pass filter would provide high performance in detecting a focusing state to the way-out-of-focus subject with a blurring edge. The use of the high-pass filter would enable high-accuracy detection of focusing state in the vicinity of the in-focus point where the edge of the subject is sharp. Subsequently, correlation amounts COR between the acquired image signals are calculated (hereinafter, called correlation calculation) at step S506. The correlation calculation is carried out in each of scanning lines after the vertical averaging in the focus detection area. The correlation amounts COR in the focus detection area are added up at step S507. Next, the correlation change amount is calculated from the correlation amount COR at step S508. Then, based on the correlation change amount calculated at step S508, the image displacement amount between the two images (hereinafter, called image displacement amount) and the degree of steepness of change in the correlation change amount (hereinafter, called maxder) are calculated at step S509. At step S510, the defocus amount is calculated by multiplying the displacement amount between the two images calculated at step S509 by a predetermined conversion coefficient. The conversion coefficient used at this time is determined by the aperture value of the diaphragm 113, the exit pupil distance of the lens, the individual information on the sensor, and the coordinates for setting the focus detection area, and is stored in the ROM 137. The calculated defocus amount is normalized by dividing by the aperture value F of the diaphragm 113 and an allowance scattering circle 5 and is independent from the aperture value F of the diaphragm 113. Finally, the degree of reliability of the defocus amount calculated at step S510 is evaluated at step S511 based on the maxder calculated at step S509. Steps 5505 to 5511 are performed for the three types of prepared filters (low-pass filter, mid-pass filter, and high-pass filter) (S512).

Next, the focus detection will be described in detail with reference to FIGS. 6 to 9.

Figure 6:
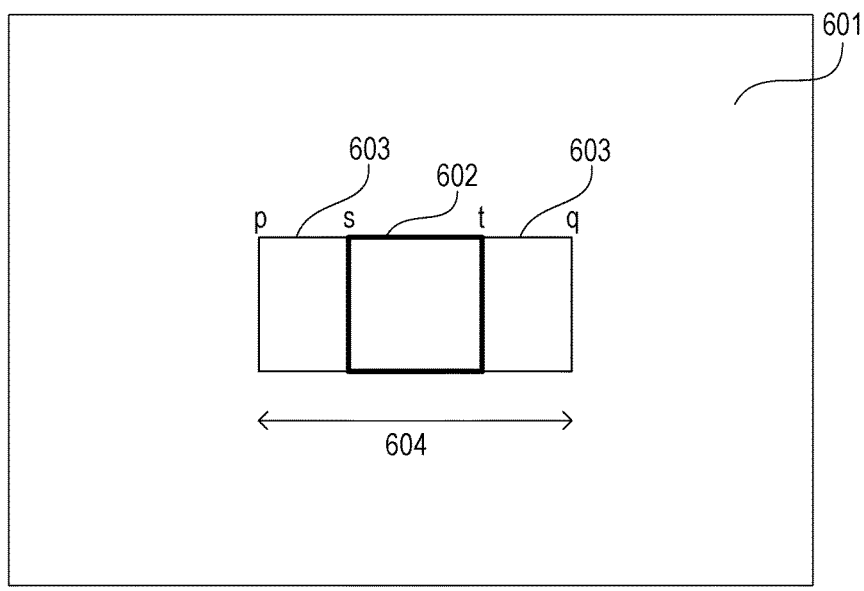
FIG. 6 is a diagram of a focus detection area in the embodiment.

FIG. 6 illustrates an example of a focus detection area 602 on a pixel array 601 of the imaging element 121 in the focus detection process. An shift area 603 on the both sides of the focus detection area 602 is an area necessary for the correlation calculation. Accordingly, a total area 604 of the focus detection area 602 and the shift area 603 is a pixel area necessary for the correlation calculation. The points p, q, s, and t in the drawing indicate horizontal coordinates (along an x-axis direction and focus detection direction). The points p and q indicate x coordinates at the start and end points in the pixel area 604, and the points s and t indicate x coordinates at the start and end points of the focus detection area 602.

Figure 7A:
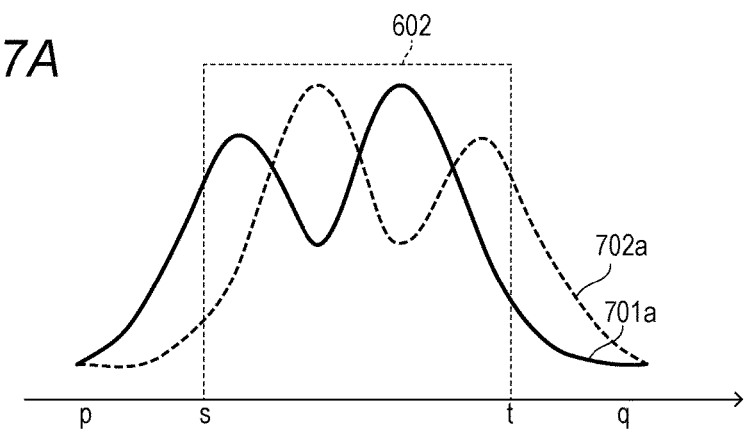
FIGS. 7A to 7C are diagrams of image signals obtained from the focus detection area in the embodiment.
Figure 7B:
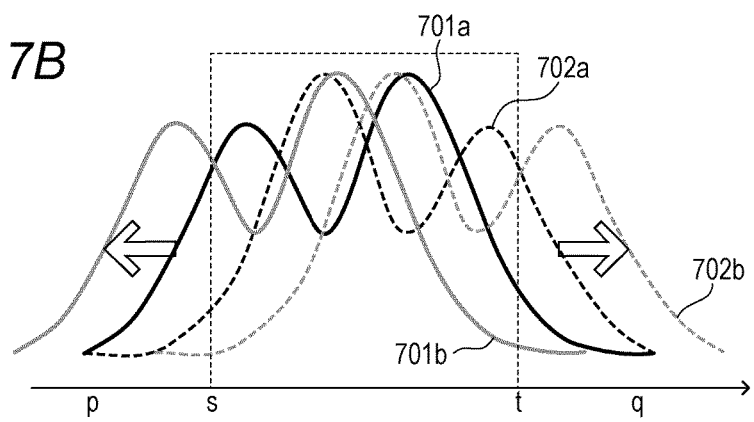
Figure 7C:
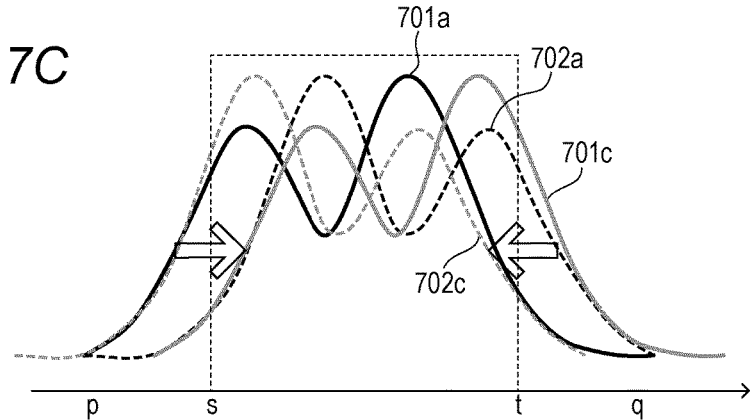

FIGS. 7A to 7C illustrate examples of signals for focus detection having undergone the filtering process in which solid lines (701a to 701c) indicate A image signals and dashed lines (702a to 702c) indicate B image signals. FIG. 7A illustrates A image and B image signals 701a and 702a before shift, and FIGS. 7B and 7C indicate the A image and B image signals shifted from the state of FIG. 7A in a plus direction and a minus direction. To calculate the correlation amount of the pair of image signals 701 and 702, both the image signals 701 and 702 are shifted by an arbitrary constant number of bits in the direction of arrow.

Next, the calculation method of the correlation amount will be described. First, the image signals 701 and 702 are shifted by an arbitrary constant number of bits as illustrated in FIGS. 7B and 7C and the sum of absolute values of difference between the image signals 701 and 702 is calculated. In the embodiment, the bit width of the shift and the total shift amount are changed depending on the used filter. In the case of using the low-pass filter for the purpose of detection of focusing state of a way-out-of-focus subject, the total shift amount is increased and the bit width of the shift is increased to reduce the calculation time. In the case of using the high-pass filter for the purpose of high-accuracy detection of focusing state, the bit width of the shift is decreased and the total shift amount is decreased to reduce the calculation time. In the following description, for the sake of simplification, the bit width of the shift is set to 1. When the total shift amount is designated as i, the minus-direction maximum shift amount as p−s, the plus-direction maximum shift amount as q−t, x as the start coordinate in the focus detection area 602, and y as the end coordinate in the focus detection area 602, the correlation amount COR can be calculated by Equation (2) as follows:

[Equation 1]

$$COR[i] = \sum_{k=x}^{y} |A[k+i] - B[k-i]| \quad (2)$$

$$\{(p-s) < i < (q-t)\}$$

Figure 8A:
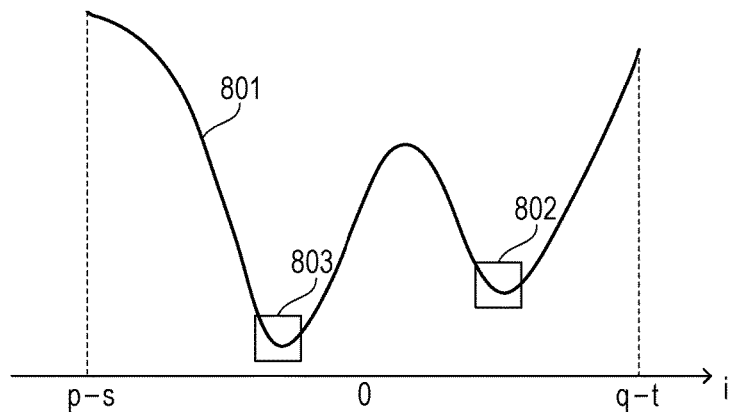
FIGS. 8A and 8B are diagrams of a correlation amount waveform in the embodiment.
Figure 8B:
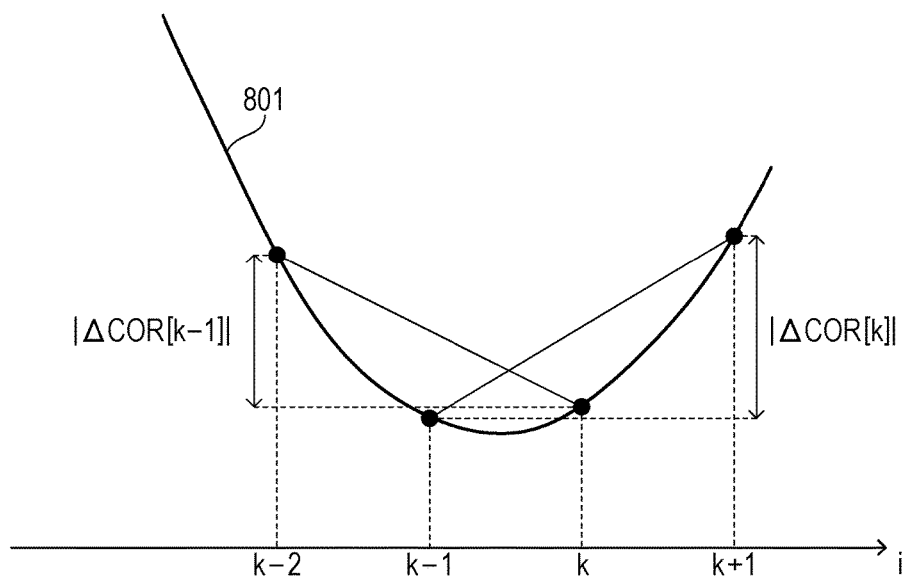

FIG. 8A illustrates an example of the relationship between the shift amount and the correlation amount COR. The horizontal axis indicates the shift amount, and the vertical axis indicates the correlation amount COR. The degree of coincidence between the pair of A image signal and B image signal is highest with the shift amount corresponding to the smaller correlation amount of either one of extreme values and their neighborhoods 802 and 803 in a correlation amount 801 changing with the shift amount.

Next, the calculation method of change amount in the correlation amount (hereinafter, called correlation change amount) will be described. The correlation change amount is calculated as the difference between the correlation amounts at each shift in the waveform of the correlation amount 801 illustrated in FIG. 8A. When the shift amount is designated as i, the minus-direction maximum shift amount as p−s, and the plus-direction maximum shift amount as q−t, a correlation change amount ΔCOR can be calculated by Equation (3) as follows:

$$\Delta COR[i] = COR[i-1] - COR[i+1]\{(p-s+1) < i < (q-t-1)\} \quad (3)$$

Figure 9A:
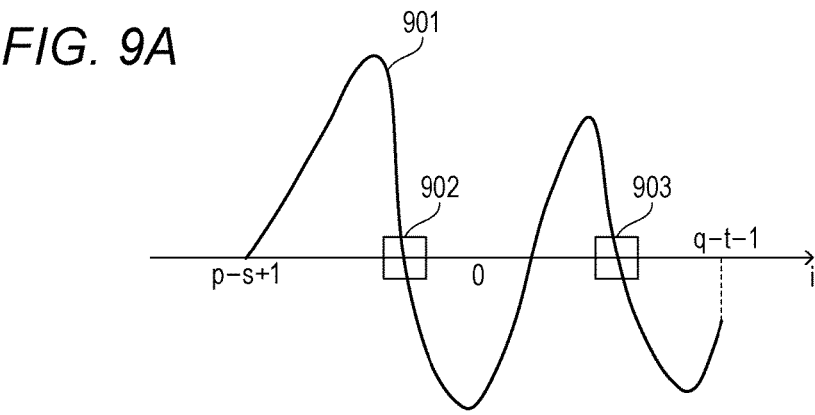
FIGS. 9A and 9B are diagrams of a correlation change amount waveform in the embodiment.

FIG. 9A illustrates an example of the relationship between the shift amount and the correlation change amount ΔCOR. The horizontal axis indicates the shift amount and the vertical axis indicates the correlation change amount ΔCOR. The correlation change amount 901 changing with the shift amount turns from plus to minus at portions 902 and 903. The state with the correlation change amount of 0 is called zero cross in which the degree of coincidence between the parallax image signals for focus detection (A image signal and B image signal). Therefore, the shift amount with zero cross constitutes the image displacement amount.

Figure 9B:
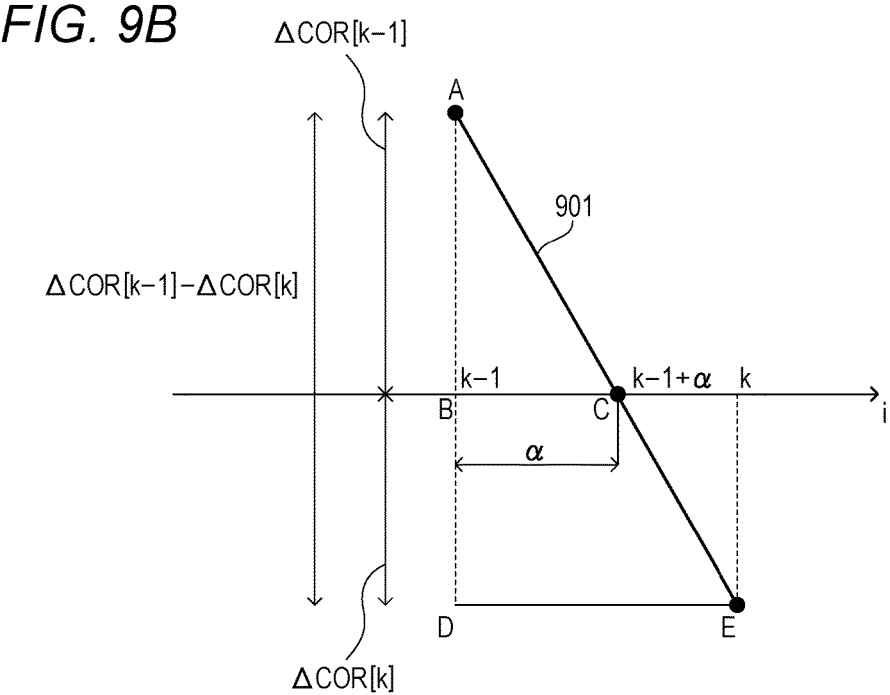

FIG. 9B is an enlarged view of the portion 902 illustrated in FIG. 9A. The calculation method of an image displacement amount PRD will be described with reference to FIG. 9B.

The shift amount with zero cross (k−1+α) is divided into an integer part β (=k−1) and a decimal part α. The decimal part α can be calculated from the relationship of similarity between a triangle ABC and a triangle ADE in the drawing by Equation (4) as follows:

[Equation 2]

$$AB:AD = BC:DE \quad (4)$$
$$\Delta COR[k-1]: \Delta COR[k-1] - \Delta COR[k] = \alpha: k - (k-1)$$
$$\alpha = \frac{\Delta COR[k-1]}{\Delta COR[k-1] - \Delta COR[k]}$$

The integer part β can be calculated with reference to FIG. 9B by Equation (5) as follows:

$$\beta = k-1 \quad (5)$$

Then, the image displacement amount PRD can be calculated from the sum of α and β.

When there exists a plurality of zero crosses of the correlation change amount ΔCOR as illustrated in FIG. 9A, the one with the larger maxder in the vicinity is set as first zero cross, and the shift amount with the first zero cross is set as the image displacement amount. The maxder is an index indicating the ease of focus detection, and high-accuracy focus detection can be performed more easily at the points with the larger values of maxder. The maxder can be calculated by Equation (6) as follows:

$$\text{maxder} = |\Delta COR[k-1]| + |\Delta COR[k]| \quad (6)$$

Next, the acquisition method of the degree of reliability at step S511 will be described with reference to FIGS. 10 to 15. In the embodiment, the degree of reliability is evaluated at four stages (the degrees of reliability 0 to 3). However, the present invention is not limited to this but the number of the evaluation stages may be set to an arbitrary value or may be set to zero. The degrees of reliability are defined below. The degree of reliability 0 means low reliability with great variations in the detected defocus amount. The degree of reliability 1 means that the defocus amount detected for a way-out-of-focus subject is not reliable but only the direction of the detected defocus is reliable. The degree of reliability 2 means that the detected defocus amount is reliable but low in accuracy. The degree of reliability 3 means that the detected defocus amount is reliable and high in accuracy and the focus can be achieved with the use of the detected defocus amount.

Figure 10:
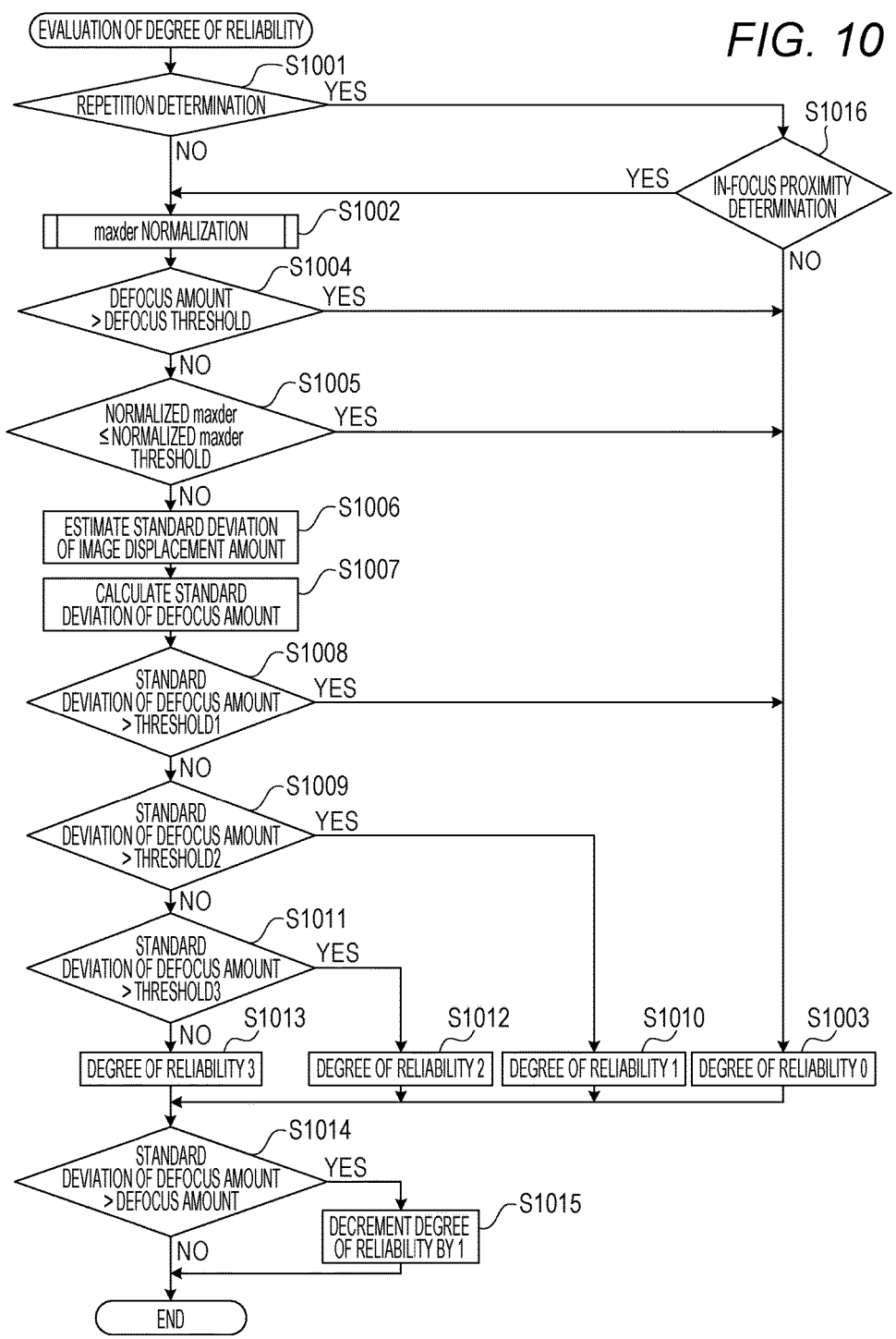
FIG. 10 is a flowchart of a reliability acquisition process in the embodiment.

First, the flow of a process for evaluating the degree of reliability will be described with reference to FIG. 10. In a repetition determination at S1001, a subject with a periodic pattern is captured in the focus detection area, and it is determined whether the focus detection signal from the focus detection area has a repetitive pattern. According to the present invention, the state in which the subject captured in the focus detection area has a periodic pattern and the focus detection signal has a repetitive pattern may be simply expressed herein as the state in which the subject has a repetitive pattern. In the embodiment, the repetition determination is made using maxder. Specifically, when there exists a predetermined number or more of zero crosses of the correlation change amount ΔCOR with the value of maxder equal to or more than the threshold, it is determined that the subject has a repetitive pattern, and when there exists a smaller number of zero crosses than the threshold, it is determined that the subject has no repetitive pattern. The threshold of maxder is preferably set based on the value of maxder in the first zero cross. In the embodiment, the repetition determination is made with the threshold of maxder set to 2 as the predetermined number obtained by multiplying the value of maxder in the first zero cross by a coefficient of 1 or less. In other words, when it is determined that there exists a plurality of zero crosses that indicates the value of maxder obtained by multiplying the maxder in the first zero cross by the predetermined coefficient, it is determined that the subject has a repetitive pattern and the process moves to step S1016.

At step S1016, the in-focus proximity determination is made. In the in-focus proximity determination, the degree of image blurring is determined based on the image signal output from the imaging element to determine whether the current focus position (at the time of light exposure of the focus detection signal) is in proximity to the in-focus position. The range in which the focus position is regarded as being in proximity to the in-focus position can be adjusted as appropriate, and therefore the in-focus proximity determination can be said to be the determination whether the current focus position falls within a predetermined range from the in-focus position. The in-focus proximity determination will be described in detail with reference to FIG. 16.

Figure 16A:
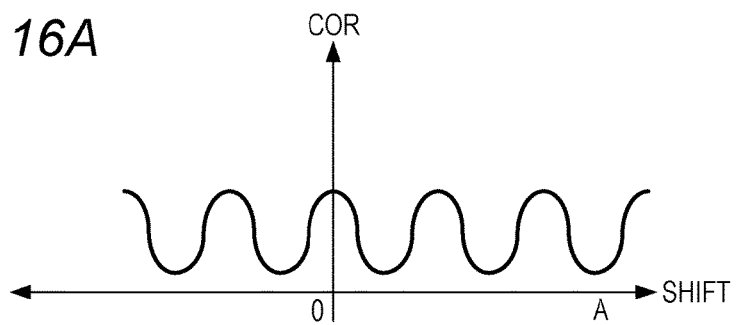
FIGS. 16A, 16B, and 16C are graphs for describing relative amount waveforms with repetitive patterns in the embodiment.
Figure 16B:
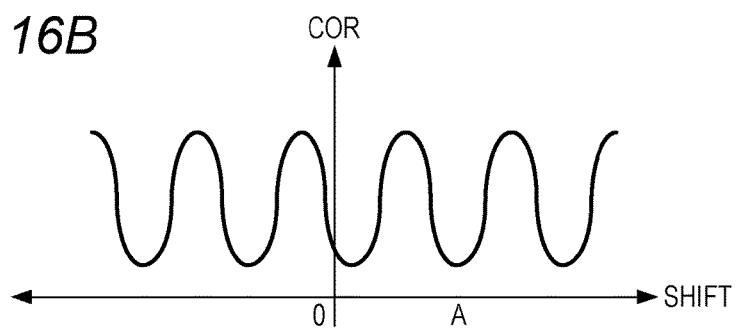
Figure 16C:
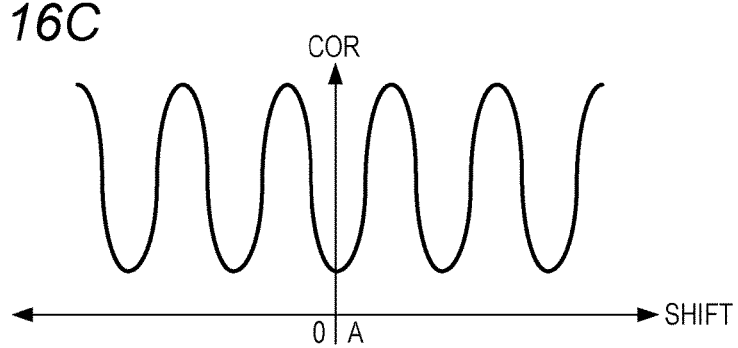

FIGS. 16A to 16C are graphs of waveforms illustrating the correlation amounts obtained from a subject with a repetitive pattern at three focus lens positions. FIG. 16A illustrates the waveform in which the degree of image blurring is high (the focus position and the in-focus position are distant from each other), FIG. 16B illustrates the waveform in which the degree of image blurring is low (the focus position and the in-focus position are slightly close to each other), and FIG. 16C illustrates the waveform in which the image is in proximity to the in-focus position (the focus position and the in-focus position are close to each other). The true in-focus point is set at A. The horizontal axis indicates the shift amount (Shift), and the vertical axis indicates the correlation amount (COR). As illustrated in FIGS. 16A to 16C, in the focus detection using the phase difference AF, the waveform indicating the correlation amount of the subject with a repetitive pattern has portions with minimum correlation amount (minimum value) on a periodic basis. The correlation waveform varies depending on the focus states illustrated in FIGS. 16A to 16C, and the portions with the minimum value (zero crosses) become inclined more steeply with increasing proximity to the in-focus point. Therefore, changing the focus state by driving actually the lens makes it possible to determine that the focus position is in proximity to the in-focus point when the correlation change amount is greatest (the COR is smallest). This allows detection of the true in-focus point. Using this characteristic, in the embodiment, it is determined whether the focus position is close to the state of FIG. 16C using the following two indexes that become larger in value when the focus position is close to the in-focus position and the degree of image blurring is low:

(1) DFD (Depth From Defocus)

DFD has a value obtained by integrating the square of the output value of the image signal for imaging (A+B image) in each pixel in the focus detection area and dividing the integrated value by the integrated value of the square of the output value of the signal for focus detection (A image or B image), which indicates the degree of image blurring. It is considered that, as the value of DFD is larger, the degree of image blurring is lower and the in-focus position and the focus position are closer to each other. DFD is expressed by the following equations:

[Equation 3]

$$DFD = \frac{(A+B)sumsq}{\frac{(A)sumsq + (B)sumsq}{2}} = \frac{2(A+B)sumsq}{(A)sumsq + (B)sumsq}$$

where

[Equation 4]

$$(A+B)sumsq = \sum_{k=1}^{nw} (A(k) + B(k))^2$$

$$(A)sumsq = \sum_{k=1}^{nw} (A(k))^2$$

$$(B)sumsq = \sum_{k=1}^{nw} (B(k))^2$$

In the foregoing equation, k denotes the number assigned to each pixel of the imaging element to identify the position, and A(k) and B(k) denote the respective signal values of the A image signal and the B image signal at the position k.

(2) Sharpness/PB

Sharpness denotes the value of sharpness of the image, and PB denotes the value of amplitude. That is, Sharpness/PB is the evaluation value of sharpness in which the sharpness of the image is normalized by PB. It is considered that the in-focus position and the focus position are closer to each other as the value of Sharpness/PB is larger.

Sharpness and PB are expressed by the following equation:

Sharpness=$\Sigma(S[k+1]-S[k])^2/\Sigma(S[k+1]-S[k])$PB=Peak-Bottom where Peak and Bottom are variables that indicate respectively the maximum output value and the minimum output value of the waveform having undergone vertical averaging, and S[k] denotes the signal value of the A+B image signal at the position k.

In the embodiment, thresholds are set to both DFD and Sharpness/PB, and when either one of them exceeds the threshold, it is determined that the degree of image blurring is lower than a predetermined degree of blurring and the focus position is in proximity to the in-focus position, and the process moves to step S1002. Adjusting the thresholds makes it possible to adjust the range in which the focus position is regarded as being in proximity to the in-focus position. These thresholds may have fixed values or may be set depending on the degree of focus. For example, the values of DFD and Sharpness/PB may be set such that the focus position can be considered to fall within the range n times as deep as the depth of focus. In this case, n can be set as appropriate from the balance between the time taken for focus adjustment and the possibility of false in-focus. When both DFD and Sharpness/PB are equal to or less than the thresholds, it is determined that the degree of image blurring is equal to or higher than the predetermined degree of blurring and the focus position is not in proximity to the in-focus position, and the process moves to step S1003. Then, the preset value 0 is acquired as the degree of reliability of the defocus amount acquired at S510. The value 0 of the degree of reliability is lowest among the candidates for the degree of reliability (0 to 3). When the degree of reliability is 0, the search driving is carried out as described above. When the subject has a repetitive pattern and the focus position is not in proximity to the in-focus position, the search driving is carried out so that the defocus amount detected at the way-out-of-focus position is not used in the focus adjustment to reduce the possibility of false in-focus. In addition, even in the case of shooting the subject with a repetitive pattern when the focus position is brought into proximity to the in-focus position as illustrated in FIG. 16C, the driving control method of the focus lens 114 is selected as in the case of shooting the subject without a repetitive pattern. This enables high-accuracy focusing control.

When a plurality of focus detection areas is set, the AF operation may be performed using the signals for focus detection from the area where it is determined at step S1001 that the subject has no repetitive pattern and the area where it is determined at step S1016 that the focus position is in proximity to the in-focus position. The repetition determination (S1001) and the in-focus proximity determination (S1016) may be exchanged in order to make the in-focus proximity determination before the repetition determination. Step 51002 and subsequent steps constitute a flow of process for selecting the driving control method of the focus lens in the cases where the subject without a repetitive pattern is to be shot and the subject with a repetitive pattern is to be shot and it is determined that the focus position is in proximity to the in-focus position. The index for evaluating variations in the image displacement amount PRD is used as the degree of reliability, and the driving control method of the focus lens is selected according to the degree of reliability. In this case, using the relationship between the standard deviation of the image displacement amount resulting from a plurality of image displacement amounts detected without movement of the focus lens and the degree of steepness maxder of change in the correlation change amount, the standard deviation of the image displacement amount PRD is acquired from maxder. However, the acquisition method of the degree of reliability is not limited to this. At step S1002, maxder is normalized under shooting conditions and subject conditions. The reason for the normalization of maxder is to enhance the accuracy of the degree of reliability. This will be described later in detail.

Next, it is determined at step S1004 whether the defocus amount calculated at step S510 is larger than the set defocus amount threshold. When the defocus amount is larger than the defocus amount threshold, the process moves to S1003 to acquire the degree of reliability 0. When the defocus amount is equal to or less than the defocus amount threshold, the process moves to step S1005.

It is determined at step S1005 whether the maxder normalized at S1002 is equal to or less than a normalized maxder threshold. When the normalized maxder is equal to or less than the normalized maxder threshold, the process moves to S1003 to acquire the degree of reliability 0. In the embodiment, the defocus amount threshold and the maxder threshold are set for each of the filters used at step S505. The defocus amount threshold is set according to the defocus amount detection performance (the limit distance measurable in terms of total shift amount) of each filter. With regard to the normalized maxder threshold, it is known that normalized maxder is small in the case where the degree of reliability is likely to be output by mistake such as in the detection of focusing state at low brightness and the detection of focusing state of a subject with a low contrast. Accordingly, setting the normalized maxder threshold decreases the possibility of outputting the incorrect degree of reliability. Since maxder varies in characteristics depending on the used filter, the normalized maxder threshold is set for each of the filters. When it is determined at step S1005 that the normalized maxder is larger than the normalized maxder threshold, the process moves to step S1006 to estimate the standard deviation of the image displacement amount based on the normalized maxder. The principles for the estimation of the standard deviation of the image displacement amount will be described later. There is a negative correlation between the normalized maxder and the standard deviation of the image displacement amount, which makes it possible to estimate the standard deviation of the image displacement amount from the normalized maxder. Next, at step S1007, the standard deviation of the image displacement amount is multiplied by a predetermined conversion coefficient to calculate the standard deviation of the defocus amount. The conversion coefficient used here is determined by the aperture value of the diaphragm 113, the exit pupil distance of the lens, the individual information of the sensor, and the coordinates for setting the focus detection area, as the conversion coefficient used to calculate the defocus amount from the displacement amount between the two images. In addition, the standard deviation of the defocus amount is normalized by dividing by the aperture value F and the allowance scattering circle δ. In the case of evaluating the degree of reliability (the standard deviation of the defocus amount) based on maxder, it is generally necessary to set a number of thresholds corresponding to the number of the conversion coefficients. Accordingly, the application of the present invention makes it possible to set more desired thresholds without a large amount of threshold data in the ROM 137. In addition, the normalization by the aperture value F allows the thresholds to be set regardless of the state of the diaphragm 113.

The degree of reliability of the defocus amount is evaluated according to the standard deviation of the defocus amount calculated as described above. For this end, in the embodiment, the thresholds of the standard deviation of the defocus amount are set in advance in three stages (THRESHOLD1, THRESHOLD2, and THRESHOLD3). First, when it is determined at S1008 that the standard deviation of the defocus amount is greater than THRESHOLD1, the process moves to S1003 to determine that the degree of reliability of the defocus amount is 0. When it is determined that the standard deviation of the defocus amount is equal to or less than THRESHOLD1 and greater than THRESHOLD2 (S1009), the process moves to S1010 to evaluate the degree of reliability as 1. When it is determined that the standard deviation of the defocus amount is equal to or less than THRESHOLD2 and greater than THRESHOLD3 (S1011), the process moves to S1012 to evaluate the degree of reliability as 2. When the standard deviation of the defocus amount is equal to or less than THRESHOLD3, the process moves to step S1013 to evaluate the degree of reliability as 3.

Figure 11A:
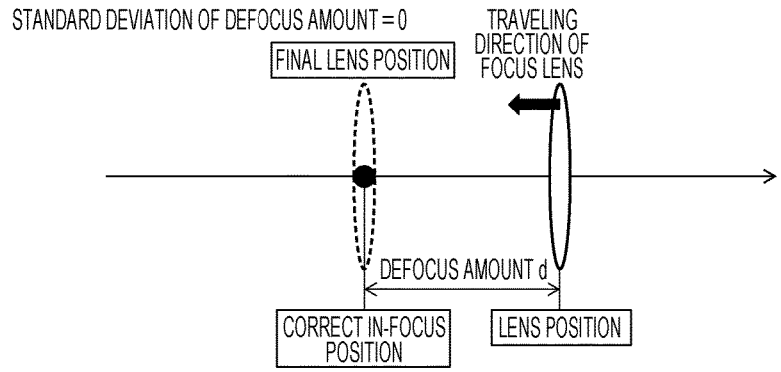
FIGS. 11A, 11B, and 11C are diagrams of defocus amounts and drive directions of the focus lens in the embodiment.
Figure 11B:
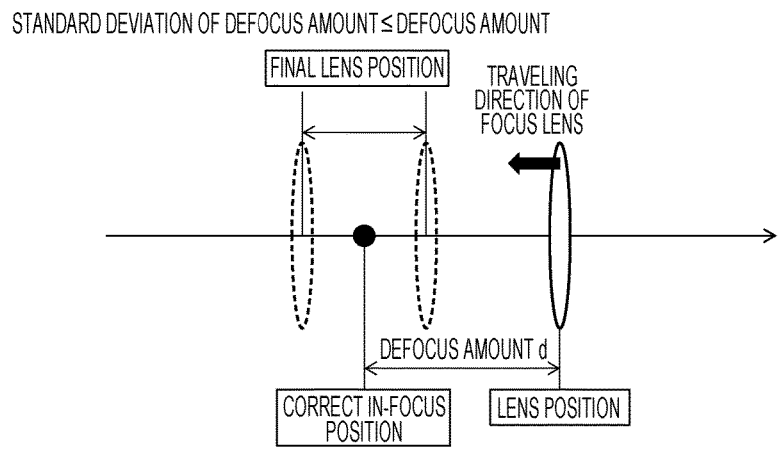
Figure 11C:
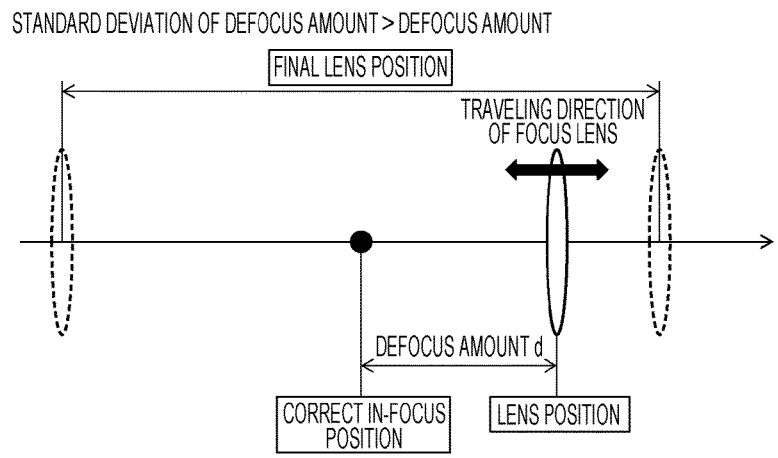

When the degree of reliability is estimated, the process finally moves to step S1014 to make a direction inversion preventive measurement. The direction inversion means the state in which the focus lens is moved in the direction opposite to the correct focus position to blur the image of the subject. When the direction inversion takes place, the user feels strangeness at the time of movie shooting or the like, which results in quality deterioration. To prevent the direction inversion, the standard deviation of the defocus amount and the defocus amount are compared to each other at step S1014. The direction inversion preventive measurement will be described with reference to FIGS. 11A to 11C. FIG. 11A illustrates the case in which the standard deviation of the defocus amount is 0. With the correct defocus amount, the focus lens is driven to the correct position and stopped at the correct focus position. FIG. 11B illustrates the case in which the standard deviation of the defocus amount is equal to or less than the defocus amount. With the detection error of the defocus amount, the defocus lens moves toward the correct focus position although there are variations in the place where the focus lens may be finally stopped. FIG. 11C illustrates the case in which the standard deviation of the defocus amount is larger than the defocus amount. With variations in the final focus lens position as in the case of FIG. 11B, the focus lens may be driven in the direction opposite to the correct focus position due to the wide range of variations. Accordingly, when the standard deviation of the defocus amount is larger than the defocus amount, the process moves to step S1015 to decrement the degree of reliability by one to reduce the possibility of the direction inversion.

The basic flow of a process for determining the degree of reliability has been described so far. However, the evaluation method of the degree of reliability may be changed depending on the filter used. FIG. 12 describes the evaluation values that can be output from the filters. The degrees of reliability with a circle can be output, and the degrees of reliability with a cross symbol are not output. With the low-pass filter, the degree of reliability 3 indicating the state in which focusing is possible is not output due to the low accuracy. With the high-pass filter, the degree of reliability 1 is not output because the total shift amount is small and the detection of focusing state of a way-out-of-focus subject is impossible. Accordingly, it is possible to reduce the possibility of outputting the incorrect degree of reliability.

Figure 13A:
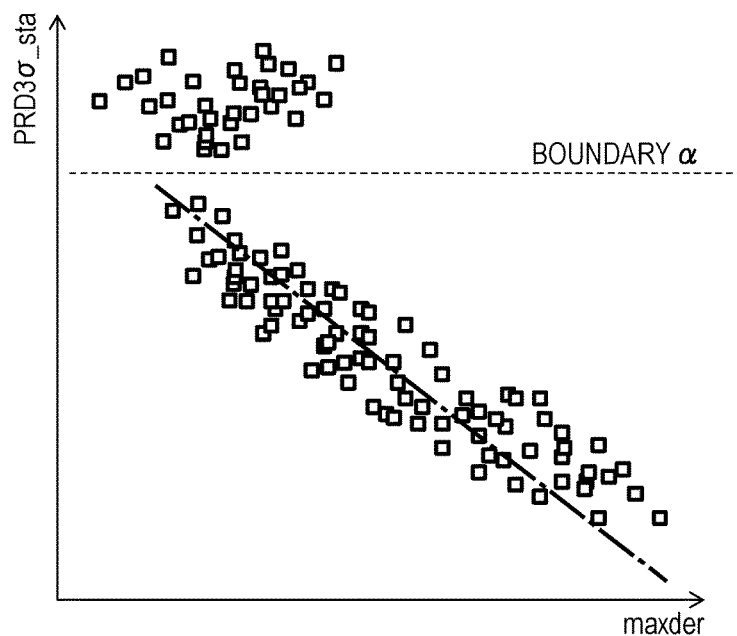
FIGS. 13A and 13B are graphs illustrating the relationship between maxder and the standard deviation of image displacement amount in the embodiment.

Subsequently, the principles for the estimation of the standard deviation of the image displacement amount from the normalized maxder will be described. FIG. 13A is a graph illustrating the correlation between maxder and the standard deviation of the image displacement amount. The vertical axis has a logarithmic scale to indicate the results of statistical calculation of the standard deviation of PRD (PRD3σ_sta) resulting from N focusing detection as expressed in Equation (7) as follows:

[Equation 5]

$$PRD3\sigma\_sta = \sqrt{\frac{1}{N}\sum_{i=1}^{N}(PRD_1 - \overline{PRD})^2} \quad (7)$$

The horizontal axis has a logarithmic scale as the vertical axis to indicate the mean values of maxder with N focusing detection. The plot points in FIG. 13A indicate the results of N focusing detection under the same conditions for environment, subject, and focusing detection settings (sensor gain, aperture, and focus lens position). It can be seen from FIG. 13A that there is a negative correlation in the area smaller in PRD3σ_sta than a boundary α. The area larger in PRD3σ_sta than the boundary α a will be described later in detail. Using the correlation in the area smaller in PRD3σ_sta than the boundary α makes it possible to estimate PRD3σ_sta from maxder. However, the relationship between maxder and PRD3σ_sta slightly varies depending on the focusing detection settings and the subject, which results in reduction of the estimation accuracy of PRD3σ_sta. Accordingly, normalizing maxder depending on the subject and the focusing detection settings as at step S1002 makes it possible to enhance the correlation between maxder and PRD3σ_sta and improve the estimation accuracy. The specific maxder normalization method will be described with reference to the flowchart of FIG. 14.

In the embodiment, the normalization of maxder is processed under the following four conditions. However, the conditions for normalization are not limited to the following four but maxder may be normalized under other conditions or some of the following four conditions.
i. Sensor gain (step S1401)
ii. The number of rows in vertical row averaging (step S1402)
iii. The number of additional rows in the correlation amount COR (step S1403)
iv. Subject contrast (step S1404)

Figure 15:
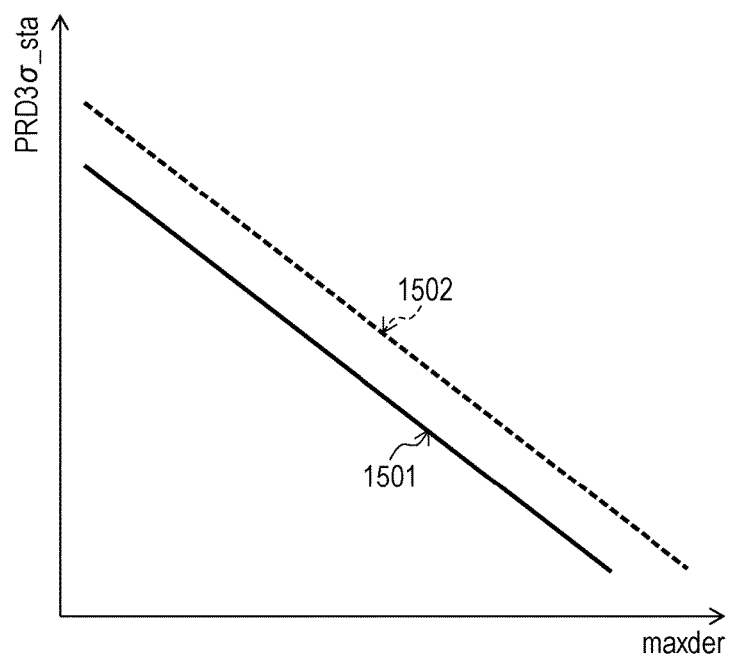
FIG. 15 is a graph illustrating the relationship between approximate lines of maxder and standard deviation of image displacement amount focusing detected under two different conditions in the embodiment.

In i. normalization by sensor gain (S1401), maxder is normalized according to the sensor gain set by the CDS/AGC/AD circuit 123. With increase in the sensor gain, the signal noise is amplified as well as the signal value, which increases variations in the detection of the image displacement amount by the correlation calculation. FIG. 15 is a graph using the same axes as those in FIGS. 13A to 13C, which indicates approximate lines obtained by plotting data under two conditions. FIG. 15 illustrates an approximate line 1501 with small sensor gain and an approximate line 1502 with large sensor gain. To eliminate the difference between the two, maxder is normalized by Equation (8) using a coefficient $a_{gain}$ determined according to the sensor gain as follows:

$$\text{norm\_maxder}_{gain} = \text{maxder} \times a_{gain} \quad (8)$$

In ii. Normalization according to the number of rows in vertical row averaging (S1402), maxder is normalized according to the value set in the vertical row averaging at S503. As described above, since increasing the number of rows in the vertical row averaging makes it possible to reduce the influence of signal noise, thereby decreasing detection variations in the image displacement amount in the correlation calculation. Therefore, PRD3σ_sta is smaller with a larger number of rows in the vertical row averaging as the approximate line 1501 is taken with a large number of rows in the vertical row averaging and the approximate line 1502 is taken with a small number of rows. Accordingly, maxder can be normalized by Equation (9) using the number of rows in the vertical row averaging nLine and coefficients $a_{line}$ and $b_{line}$ as follows:

$$\text{norm\_maxder}_{line} = \text{maxder} \times (a_{line} \times n\text{Line} + b_{line}) \quad (9)$$

In iii. Normalization according to the number of additional rows in the correlation amount COR (S1403), maxder is normalized according to the setting value for the addition of the correlation amount COR at S507. With a larger number of additional rows in the correlation amount COR, the correlation change amount ΔCOR becomes larger, and the value of maxder becomes larger as well. Accordingly, PRD3σ_sta becomes smaller with a smaller number of additional rows as the approximate line 1501 is taken with a small number of additional rows and the approximate line 1502 is taken with a large number of additional rows in the correlation amount COR as illustrated in FIG. 15. Accordingly, maxder can be normalized by Equation (10) using the number of additional rows nCOR in the correlation amount COR and coefficients $a_{cor}$ and $b_{cor}$ as follows:

$$\text{norm\_maxder}_{cor} = \text{maxder} \times (a_{cor} \times n\text{COR} + b_{cor}) \quad (10)$$

In iv. Normalization according to the subject contrast (S1404), maxder is normalized according to the subject contrast CNT calculated at S504. When the contrast of the subject is low, detection variations in the image displacement amount increase in the correlation calculation. PRD3σ_sta becomes smaller with a higher contrast of the subject as the approximate line 1501 is taken with a higher subject contrast and the approximate line 1502 is taken with a lower subject contrast as illustrated in FIG. 15. Accordingly, maxder can be normalized by Equation (11) using the subject contrast CNT and coefficients $a_{cnt}$ and $b_{cnt}$ as follows:

$$\text{norm\_maxder}_{cnt} = \text{maxder} \times (a_{cnt} \times n\text{CNT} + b_{cnt}) \quad (11)$$

Figure 13B:
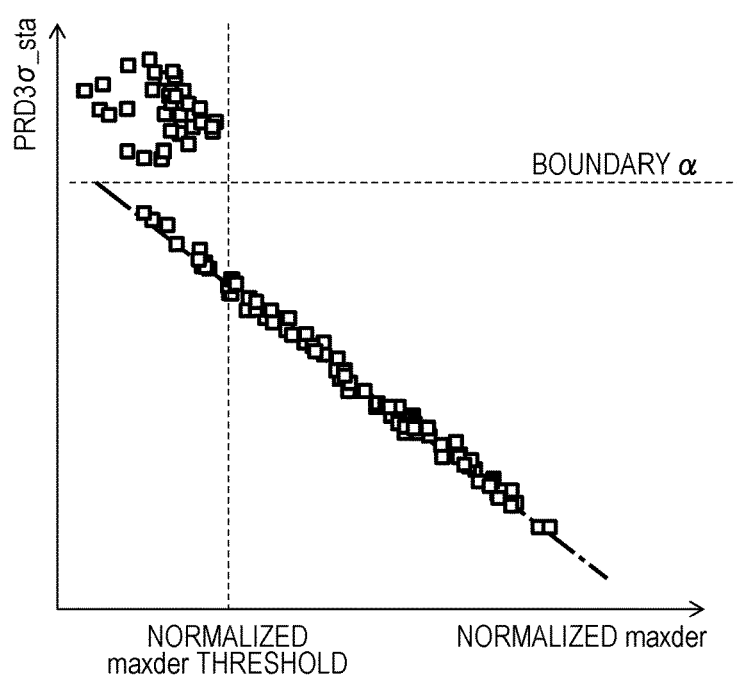
Figure 14:
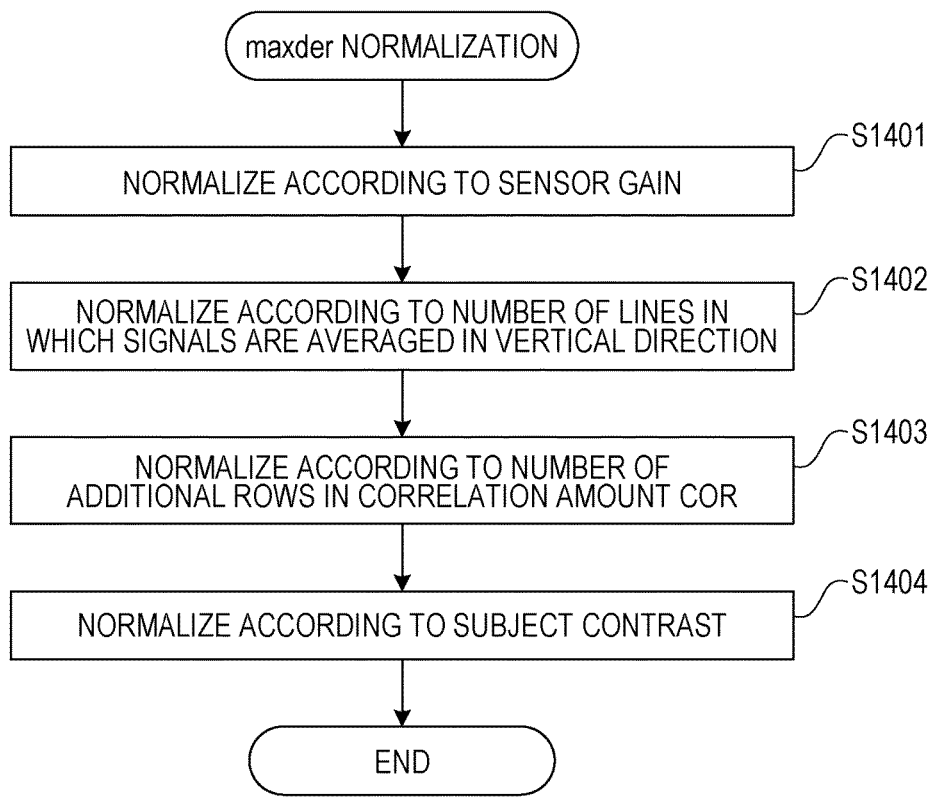
FIG. 14 is a flowchart of normalization of maxder in the embodiment.

The coefficients used in the normalization calculation of maxder under the foregoing four conditions are prepared according to the three types of filters. FIG. 13B illustrates the relationship between the normalized maxder and PRD3σ_sta after the normalization of maxder. It can be seen that the graph in FIG. 13B shows a strong negative correlation as compared to the graph in FIG. 13A. Accordingly, the estimated standard deviation PRD3σ_est of the image displacement amount can be calculated by preparing Equation (12) using norm_maxder as the maxder normalized under the four conditions and coefficients a and b calculated from the premeasured data as follows:

$$PRD3\sigma\_est = a \times \text{norm\_maxder}^b \quad (12)$$

Subsequently, the area larger in the standard deviation PRD3σ_sta of the image displacement amount than the boundary α will be described. This area is large in the standard deviation of the image displacement amount and is in low in the degree of reliability of the defocus amount. Thus, the degree of reliability of the environment, subject, and focusing detection settings plotted in this area is desirably regarded as not good. Accordingly, in the embodiment, the degree of reliability in the area larger in the standard deviation of the image displacement amount than the boundary α is regarded as not good by setting the normalized maxder threshold at step S1006 as illustrated in FIG. 13B. The method of decreasing the degree of reliability in this area is not limited to the setting the maxder threshold as illustrated in FIG. 13B, but the degree of reliability may be evaluated as low with reference to other evaluation values in the correlation calculation.

As described above, a camera 10 of the embodiment calculates the standard deviation of the defocus amount based on maxder output at one focus detection to evaluate the reliability of the defocus amount and acquire the degree of reliability. At that time, maxder is normalized according to the focusing detection settings and the subject to increase the accuracy of the degree of reliability of the defocus amount, which makes it possible to set further fine thresholds for the degree of reliability. Acquiring the degree of reliability of the defocus amount in this manner allows more stable AF control. The degree of reliability of the defocus amount may be acquired by another method. The degree of reliability of the defocus amount may be acquired from a value except for maxder in correlation with the standard deviation of the image displacement amount, or focusing detection may be actually performed a plurality of times to calculate the standard deviation of the image displacement amount. However, the use of maxder is more preferable than performing actual focusing detection a plurality of times because the degree of reliability can be acquired more quickly. When the degree of reliability of the defocus amount can be evaluated, the degree of reliability may be acquired based on a value other than the value of the standard deviation.

In the foregoing embodiment, the degree of reliability is selected from among the preset candidates (0 to 3) for the degree of reliability and the focus driving is selected according to the selected degree of reliability. However, the present invention is not limited to this as far as the focus driving can be performed according to the degree of reliability. For example, when the process moves to step S1003 described in FIG. 10, the degree of reliability is determined as 0 at step S1003, and after step S302 described in FIG. 3, and the search driving is performed at step S303. However, the same control can be carried out by determining the search driving at step S1003 described in FIG. 10. That is, when it is determined at step S1016 that the focus position is in proximity to the in-focus position, performing a predetermined focus driving makes it possible to execute the appropriate control method of the focus adjustment operation without having to acquire the degree of reliability of the detected defocus amount. The driving control method is preferably the method by which to drive the focus lens by a predetermined driving amount (search driving), not the defocus amount at the detected focus position. After the movement, the focus detection is performed again, and the movement of the focus lens and the focus detection are repeated until No is determined in the repetition determination due to changes in the subject (S1001) or Yes is determined in the in-focus position proximity determination (S1016).

Instead of using maxder, the repetition determination may be made using the results of image analysis of the image signal for imaging (A+B image signal). By analyzing the brightness of the image signal to check for periodicity, it can be determined whether a subject with a repetitive pattern is being shot in the focus detection area.

In the foregoing embodiment, the in-focus proximity determination is made only when it is determined that a repetitive pattern is being shot in the focus detection area, and when the focus position is not in proximity to the in-focus position, a low degree of reliability is acquired. However, the present invention is also applicable to the scene in which a false in-focus point is detected with the phase difference AF. In this case, instead of the repetitive pattern determination, another determination on whether a false focus point is prone to be detected may be made.

According to the foregoing embodiment, it is possible to perform the appropriate focusing operation even on a subject with a periodic pattern.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-179918, filed Sep. 14, 2016, which is hereby incorporated by reference herein in its entirety.

What is claimed is:

1. A focus adjustment apparatus comprising:
    an imaging unit configured to convert light from an optical system to an electric signal by photoelectric conversion and output an image signal for imaging and a pair of parallax image signals in a focus detection area;
    a focus detection unit configured to detect a defocus amount using the pair of parallax image signals;
    a control unit configured to control adjustment of a focus position of the optical system based on the defocus amount;
    a first determination unit configured to determine whether the imaging unit is imaging a subject with a repetitive pattern in the focus detection area; and
    a second determination unit configured to determine whether a degree of image blurring is equal to or more than a predetermined degree of blurring using at least one of the image signal for imaging and the pair of parallax image signals, wherein
    when the first determination unit determines that the imaging unit is imaging a subject with a repetitive pattern in the focus detection area and the second determination unit determines that the degree of image blurring is equal to or more than the predetermined degree of blurring, the control unit moves a focus lens in the optical system to acquire a new defocus amount.

2. The focus adjustment apparatus according to claim 1, wherein, when the first determination unit determines that the imaging unit is imaging the subject with the repetitive pattern in the focus detection area and the second determination unit determines that the degree of blurring is equal to or more than the predetermined degree of blurring, the control unit moves the focus lens in the optical system at a speed set based on a focus depth.

3. The focus adjustment apparatus according to claim 1, wherein, when the first determination unit determines that the imaging unit is imaging the subject with the repetitive pattern in the focus detection area and the second determination unit determines that the degree of blurring is equal to or more than the predetermined degree of blurring, the control unit acquires the new the defocus amount until the second determination unit does not determine any longer that the degree of blurring is equal to or more than the predetermined degree of blurring.

4. The focus adjustment apparatus according to claim 1, comprising an acquisition unit configured to, when the first determination unit does not determine that the imaging unit is imaging the subject with the repetitive pattern in the focus detection area and the second determination unit determines that the degree of blurring is less than the predetermined degree of blurring, acquire the degree of reliability of the defocus amount based on the pair of parallax image signals, and
    when the first determination unit determines that the imaging unit is imaging the subject with the repetitive pattern in the focus detection area and the second determination unit determines that the degree of blurring is equal to or more than the predetermined degree of blurring, acquire a first value as the degree of reliability, wherein
    the control unit controls adjustment of the focus position according to the degree of reliability of the defocus amount acquired by the acquisition unit.

5. The focus adjustment apparatus according to claim 4, wherein
    the acquisition unit acquires the degree of reliability of the defocus amount by selecting the degree of reliability of the defocus amount from among candidates for the degree of reliability of the defocus amount, and
    the first value constitutes the lowest value of the degree of reliability among the candidates for the degree of reliability of the defocus amount.

6. The focus adjustment apparatus according to claim 4, wherein
    the focus detection unit performs correlation calculation while shifting the pair of parallax image signals and detects the defocus amount based on results of the correlation calculation, and
    the acquisition unit acquires the degree of reliability based on the pair of parallax image signals by acquiring the degree of reliability based on the results of the correlation calculation.

7. The focus adjustment apparatus according to claim 6, wherein the acquisition unit acquires the degree of reliability based on the degree of steepness of change in correlation amount acquired by the correlation calculation.

8. The focus adjustment apparatus according to claim 1, wherein
    the focus detection unit performs correlation calculation while shifting the pair of parallax image signals and detects the defocus amount based on results of the correlation calculation, and
    the first determination unit determines that a subject with a repetitive pattern is being imaged in the focus detection area when the degree of steepness in the correlation amount acquired by the correlation calculation has a predetermined number or more of minimum values equal to or greater than a threshold, and
    the first determination unit does not determine that a subject with a repetitive pattern is being imaged in the focus detection area when the degree of steepness has a smaller number of minimum values equal to or greater than the threshold.

9. The focus adjustment apparatus according to claim 8, wherein the first determination unit determines the threshold based on the magnitude of the degree of steepness with the greatest minimum value.

10. The focus adjustment apparatus according to claim 1, further comprising a setting unit configured to set a plurality of focus detection areas, wherein
    the first determination unit determines whether there exists any of the plurality of focus detection areas where a subject with a repetitive pattern is not being imaged, and
    when there exists any of the plurality of focus detection areas where the subject with the repetitive pattern is not being imaged, the control unit controls adjustment of the focus position based on a defocus amount acquired from the pair of parallax image signals in the focus detection area where the subject with the repetitive pattern is not being imaged.

11. A control method of a focus adjustment apparatus including an imaging unit configured to convert light from an optical system to an electric signal by photoelectric conversion and output an image signal for imaging and a pair of parallax image signals in a focus detection area, wherein the control method comprises:

a focus detection step of detecting a defocus amount using the pair of parallax image signals;

a control step of controlling adjustment of a focus position of the optical system based on the defocus amount;

a first determination step of determining whether the imaging unit is imaging a subject with a repetitive pattern in the focus detection area;

a second determination step of determining whether the degree of image blurring is equal to or less than a predetermined degree of blurring using at least one of the image signal for imaging and the pair of parallax image signals, wherein at the control step, when it is determined at the first determination that the imaging unit is imaging the subject with the repetitive pattern in the focus detection area and it is determined at the second determination that a degree of image blurring is equal to or more than the predetermined degree of blurring, a focus lens in the optical system is moved to acquire a new defocus amount.

* * * * *